United States Patent Office 3,329,342
Patented July 4, 1967

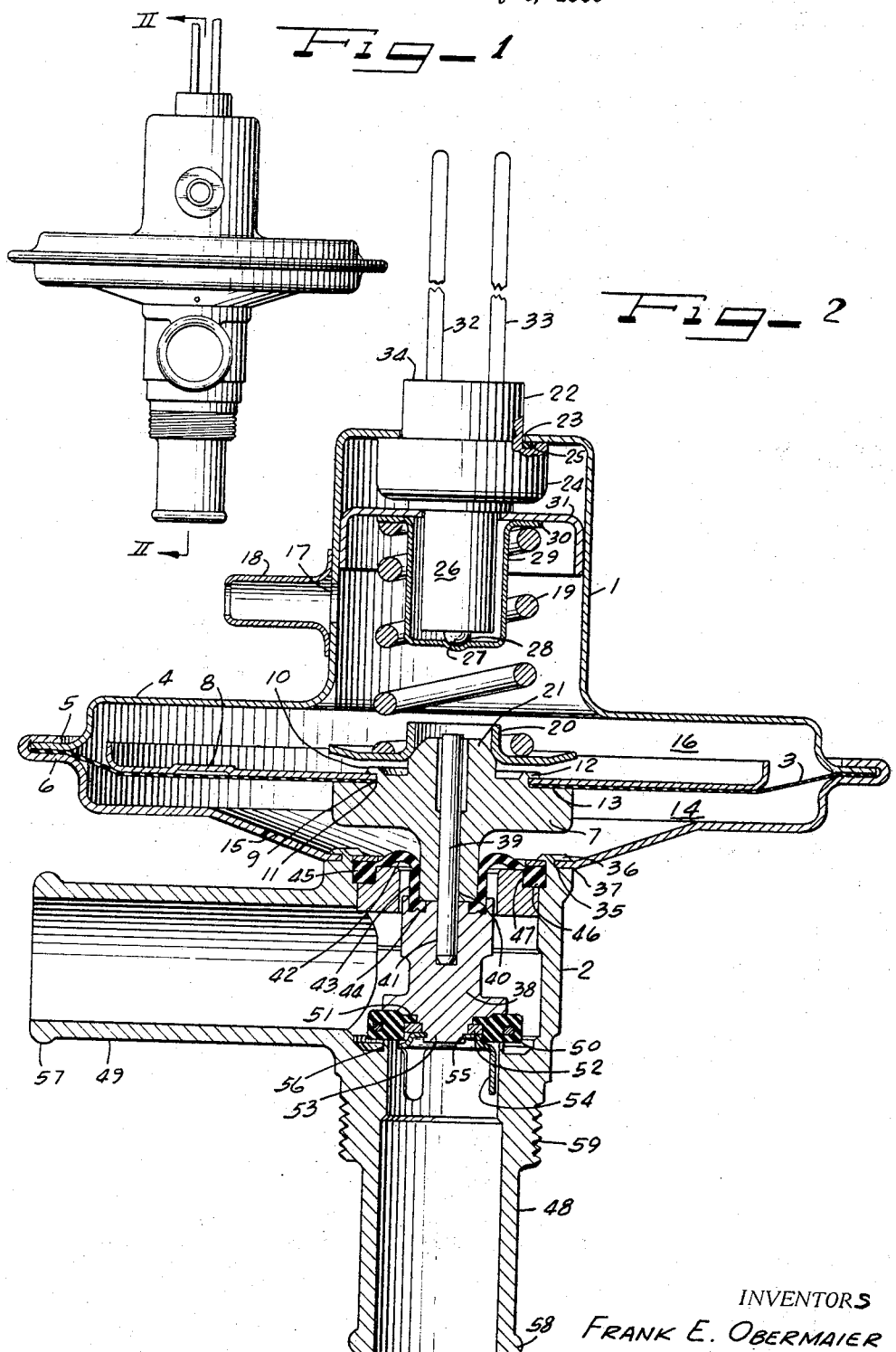

3,329,342
AUTOMATIC CAR TEMPERATURE CONTROL SYSTEM
Frank E. Obermaier, Park Ridge, Eugene E. Stratynski, Morton Grove, and Arthur A. Scott, Chicago, Ill., assignors to The Dole Valve Company, Morton Grove, Ill., a corporation of Illinois
Filed July 6, 1965, Ser. No. 469,768
4 Claims. (Cl. 236—86)

ABSTRACT OF THE DISCLOSURE

A variable flow fluid control system having a system housing with a control section and a valve section, a resilient diaphragm extending across the interior of the control section to define first and second chambers, the first chamber being connected to a vacuum source and the second chamber being connected to the atmosphere. A thermal power unit is deployed in the first chamber and tends to move the diaphragm in a direction toward the second chamber for actuating a valve means. The vacuum source exerts a force on the diaphragm to oppose the movement of the diaphragm in response to the energization of the thermal power unit.

BACKGROUND OF THE INVENTION

*Field of the invention*

The field of art to which this invention pertains is a variable flow fluid control valving system, and particularly a valve system utilizing the combination of a thermal power unit and a vacuum source to operate a valve means in response to temperatures within remote environments.

SUMMARY

An important feature of this invention is to provide an automatic in-car heating system to compensate for fluctuations in heater discharge temperature.

Another feature of the invention is to provide an automatic in-car heater system to compensate for variations in outside or ambient temperature.

An object of the invention is to provide an in-car heater system for integrating temperature signals received from distant locations.

Another object of the invention is to provide a variable flow fluid valve which is responsive to an integrated temperature signal.

Other and further objects of this invention will be apparent to those skilled in this art from the following detailed description and the annexed sheets of drawings which show several embodiments of the invention.

BRIEF DESCRIPTION OF THE DRAWINGS

FIGURE 1 is an elevated side view of the temperature control device of this invention showing the external configuration thereof; and FIGURE 2 is a sectional view of the temperature control device of this invention as taken along the lines II—II of FIGURE 1.

A preferred embodiment of the temperature control device of this invention is shown in FIGURES 1 and 2 as comprising a water valve assembly which is used to vary the rate of water flow through an automobile heater. In this way, changes in water temperature and in outside temperature can be compensated by maintaining a proper heat flow to the passenger compartment. For instance, if the water temperature should increase, the heat flow to the passenger compartment can be held constant by reducing the rate of water flow to the heater. Likewise, if outside temperature should fall, heat flow to the passenger compartment can be increased correspondingly by increasing the rate of water flow.

Adjusting the water valve to compensate for these variables is accomplished here through the use of a temperature sensitive power unit which is used to vary a biasing force applied for opening or closing the valve head. Feelers attached to this power unit and which are, themselves, temperature sensitive, are deployed in the environments to be compensated, for the purpose of delivering the temperature information of those regions back to the power unit which will adjust the valve bias accordingly. In this embodiment, two capillaries are extended from the thermal element, one to the in-car heater duct for sensing heater discharge temperature and one to an air intake duct for sensing ambient temperature.

It should be recognized, however, that a third feeler could be employed for sensing in-car temperature in a manner similar to the functioning of the two feelers described here. Or one feeler can sense more than one temperature region; for instance, a single feeler may be used to sense discharge temperature and in-car temperature. This is possible as the thermal activity of the feeler is a function of the fluid volume. In such a case, part of the volume would be deployed within the heater region, while the remaining volume would be deployed in-car. The result would be a summation of the separate thermal stimuli.

While compensation is accomplished by altering the bias for opening or closing the water valve, the principal motion operator takes the form of a resilient diaphragm secured to the valve head and orientated to be vacuum sensitive. The vacuum supply used to operate this diaphragm originates at the automobile's intake manifold and may itself be modulated to reflect in-car temperature. For instance, a bi-metal thermal element may be used as an in-car space thermostat for increasing or decreasing the vacuum supply to the vacuum operator of the present invention or a third feeler may be used as mentioned above. In this way, the rate of water flow to the environmental heater may be varied as a function of the summation of three temperature signals, the signal reflecting the in-car temperature, and the signals reflecting heater discharge and outside temperature.

Referring to this device in greater detail, it can be seen in FIGURE 2 that the heater control is divided into two housings—a control housing 1 and a valve housing 2. The control housing itself may be referred to as having two sections—a thermostat and a vacuum operator section.

Referring to the control housing first, it can be observed that the vacuum operator here consists of a resilient diaphragm 3 disposed within a disk-like chamber 4 and secured between upper and lower peripheral flanges 5 and 6 respectively. It may be noted that the lower flange 6 is rolled about the flange 5 for compressing the resilient diaphragm 3 to form a vacuum seal therebetween.

An upper poppet 7 is suspended centrally of the diaphragm 3 for being both operated by the movement of the diaphragm and for being biased by the thermal element. It may be noted at this point that movement of the upper poppet 7 will be utilized directly for operating the lower valve members and for controlling the rate of water flow through the heating system.

The upper poppet 7 is mounted centrally of the diaphragm 3 through a process similar to the diaphragm mounting intermediate the peripheral flanges 5 and 6. In particular, the diaphragm 3 and a reinforcement plate 8 are provided with central openings 9 and 10, respectively, which are fitted about a collar 11 of the poppet 7. Once in this position an upper lip 12 is rolled downward for compressing the diaphragm 3 intermediate the plate 8 and an upper face 13 of the poppet 7.

This positioning of the diaphragm 3 divides the control housing into upper and lower chambers which may functionally be characterized as vacuum and atmospheric chambers. The lower chamber 14 is continuously maintained at atmospheric pressure due to the presence of a vent port 15 extending from the lower housing wall. In contrast, the upper chamber 16 is maintained below atmospheric pressure to a degree determined by the vacuum supply received at an inlet 17. For this purpose, the inlet 17 is provided with a nipple 18 for receiving a vacuum hose or the like. As has been remarked, the vacuum received at the inlet 17 may be modulated to directly reflect in-car temperature. For instance, a decline of in-car temperature would be reflected by an increase in vacuum supply for developing a pressure differential across the diaphragm 3 which would be favorable for opening the lower water valve and increasing the heat flow to the passenger compartment.

However, the upward movement of the diaphragm 3 required for opening the lower water valve will be significantly retarded by the downward biasing force associated with the thermal power unit. This biasing force derives fundamentally from the presence of a coil spring 19 which is disposed between the upper control housing and a spring locator 20 which is received at a boss 21 of the upper poppet 7. Were the spring 19 the only biasing force applied, the downward force on the upper poppet 7 would be constant for a given position of the diaphragm 3. However, the additional complexity of the thermal power unit is introduced to increase or decrease the spring tension according to the above-described external temperature changes.

The thermal element associated with this invention consists of a casing 22 fixedly mounted at the upper surface of the control housing within an opening 23. The casing 22 has a radially enlarged portion 24 which abuts the inner face of the control housing adjacent the opening 23 and which is provided with a resilient gasket 25 for developing a pressure seal therebetween. The casing 22 is also provided with a guide sleeve 26 for slidably receiving a relatively extensible power member 27. The member 27 is then positioned within a socket 28 formed at the lower surface of a carraige member 29 which has an outwardly extending flange 30 for engaging the upper extremity of the coil spring 19. It is appreciated, therefore, that as the relatively extensible power member 27 is caused to depend from the guide sleeve 26, the carriage member 29 is forced in a downward direction for increasing the tension of the coil spring 19. It may be noted that the upward progression of the carriage member 29 is limited by a collar 31 mounted about the guide sleeve 26. In this way, the biasing force received at the upper poppet 7 is applied as a function of the temperatures sensed by the thermal element.

The temperatures which are to be sensed by the thermal element, and hence to be reflected by an extension or a withdrawal of the power member 28, are the heater discharge temperature and the ambient or outside temperature. As both these environments may be considerably removed from the spacial orientation of the water valve, the thermal element is provided with feelers in the form of capillaries 32 and 33 extending from the upper face 34 of the casing 22. These capillaries may be of considerable length for extending to the separate environments to be measured and may have spiraled outer extremities for occupying a minimum area within the respective regions. For instance, the capillary 32 may be extended to the heater discharge area and may have its outer extremity positioned within a heating duct. Likewise, the capillary 33 may be extended for sensing the outside temperature and may have its outer extremity positioned within an air intake duct. Both capillaries are intended to be filled with a non-compressible thermally expansible fluid such as ethylene glycol or the like. In this way, the expansion of the fluid within the capillaries 32 and 33 will be reflected by an extension of the power member 27 for increasing the biasing force applied to the upper poppet 7. Therefore, fluctuations in ambient or heater discharge temperature are compensated by altering the degree of vacuum required to operate the diaphragm 3 and hence the lower water valve.

As an example of the compensation provided by the above-described thermal element, consider that a thermostat within the passenger area of an automobile has signalled for increased heat by increasing the vacuum supply delivered to the inlet 17. The resulting pressure differential across the diaphragm 3 will be favorable for raising the upper poppet 7 and opening the lower valve assembly to increase the water flow to the heater unit. However, due to high engine speeds, an increase in engine water temperature may result. If the rate of water flow to the heater unit were determined only by the demands of the in-car thermostat, this sudden increase in water temperature would overheat the passenger areas before the in-car thermostat could adequately respond. In this case, however, the capillary 32 will sense the change in heater temperature and correspondingly increase the downward bias applied to the poppet 7 for reducing the rate of water flow through the lower valve assembly. Likewise, sudden increases or decreases in outside temperature can be anticipated by the provision for the capillary 33 which will accordingly alter the bias applied to the poppet 7 for changing the setting of the lower water valve.

Referring now to the lower valve assembly which as mentioned is directly actuated by the upper poppet 7, it can be seen that the valve housing 2 is secured to the control housing 1 within an actuation opening 35 formed centrally of the lower control housing wall. For this purpose, a lip 36 of the control housing 1 is fitted within a groove 37 formed circumferentially at the upper portion of the valve housing 2. The upper poppet 7 is fixedly secured to the lower poppet 38 by a roll pin 39 which is press fitted within upper and lower slots 40 and 41 formed within the upper and lower poppets respectively.

The fact that the upper and lower poppets are formed as separate elements to be joined later provides a means for securing a second diaphragm 42 within the actuation opening 35. For this purpose, the diaphragm 42 has a tubular section 43 and an annular lip 44 which is fitted within a complementary groove formed within the lower poppet 38. The upper poppet 7 is received within the tubular section 43 and is pressed against the annular lip 44 for forming a pressure seal between the two members. The diaphragm 42 is secured at its outer extremity by a bead 45 which is also fitted with in a complementary groove and which is compressed between the faces 46 and 47 of the valve and control housings respectively. It is to be remembered that the region below the diaphragm 42 is a fluid zone while that above the diaphragm 42 is an atmospheric chamber. It is obvious, therefore, that the water pressure within the valve housing must be insulated from interferring with the diaphragm 3 and, hence, the requirement for the secondary diaphragm 42.

Important to the operation of this valve assembly is the fact that the upper and lower poppets 7 and 38 are disposed to be operated axially of a nipple 48. It can be seen, therefore, that if the nipple 48 is utilized as an outlet and the right angle nipple 49 is utilized as an inlet, the bias applied to the lower poppet 7 will be unaffected by the water pressure within the system. This is due to the fact that pressure received at the inlet 49 will be directed at right angles to the axis of operation and will neither add nor subtract from the functioning of the vacuum or thermal elements.

To provide a water seal with the outlet 48 the lower poppet 38 is equipped with a resilient valve head 50 mounted at a lower face 51 by a pressure ring 52 which is press fitted about a depending boss 53. The lower poppet 38 is also provided with guide stems 54 snap fitted into an annular groove 55 formed about the boss 53. These guide stems are utilized to align the resilient valve head 50 with a valve seat 56 formed at the entrance of the outlet nipple 48 and in particular are used to resist water pressure which is received within the nipple 49. To make connections with the external fluid circuit, the inlet 49 is provided with a radially enlarged rim 57, while the outlet 48 is provided with a similar rim 58 and also with a threaded collar 59 as an alternative or supplementary means of attachment.

It will be understood that various modifications may be suggested by the embodiment disclosed, but we desire to claim within the scope of the patent warranted hereon all such modifications as come within the scope of our invention.

We claim as our invention:

1. A variable flow fluid control system comprising: a system housing having a control section and a valve section thereof, a resilient diaphragm extending across the interior of said control section for forming a first and second chamber thereby, said first chamber being connected to a vacuum source and said second chamber being connected to the atmosphere, a sensor opening formed within said housing at said first chamber substantially centrally of said resilient diaphragm, a thermal power unit disposed within said sensor opening and having a thermally extensible power member depending within said first chamber, an actuation opening connecting said second chamber to said valve section, an upper poppet secured to said resilient diaphragm and extending through said actuation opening, a lower poppet within said valve section, a second resilient diaphragm disposed across said actuation opening, a bore formed centrally of both said upper and lower poppets, a pin forceably fitted within said bores and tightly interconnecting said upper and lower poppets, said upper and lower poppets thereby compressing said resilient diaphragm therebetween for providing a pressure seal between said control section and said valve section, a valve seat formed intermediate said inlet and said outlet, a valve head attached to said lower poppet and being cooperable with said valve seat for controlling the flow of fluid from said inlet to said outlet, biasing means disposed intermediate said thermally extensible power member and said lower poppet for maintaining said valve head against said valve seat.

2. A variable flow fluid control system comprisnig: a system housing having a control section and a valve section thereof, a resilient diaphragm extending across the interior of said control section for forming a first and second chamber thereby, said first chamber being connected to a vacuum source and said second chamber being connected to the atmosphere, a sensor opening formed within said housing at said first chamber substantially centrally of said resilient diaphragm, a thermal power unit disposed within said sensor opening and having a thermally extensible power member depending within said first chamber, an actuation opening connecting said second chamber to said valve section, an upper poppet secured to said resilient diaphragm and extending through said actuation opening, said upper poppet having a central boss extending into said first chamber, a spring locator within said first chamber at said upper poppet, and mounted on said boss, a coil spring disposed intermediate said thermally extensible power member and said spring locator for exerting a force on said central boss for biasing said upper poppet outwardly of said first chamber, a lower poppet within said valve section, a second resilient diaphragm disposed across said actuation opening, said upper poppet secured to said lower poppet and compressing said second resilient diaphragm therebetween for providing a pressure seal between said control section and said valve section, a valve seat formed at said outlet, a valve head attached to said lower poppet and being cooperable with said valve seat for controlling the flow of fluid from said inlet to said outlet.

3. A variable flow fluid control system comprising: a system housing having a control section and a valve section thereof, a resilient diaphragm extending across the interior of said control section for forming a first and second chamber thereby, said first chamber being connected to a vacuum source and said second chamber being connected to the atmosphere, a sensor opening formed within said housing at said first chamber substantially centrally of said resilient diaphragm, a thermal power unit disposed within said sensor opening and having a thermally extensible power member depending within said first chamber, a thermal element within said thermal power unit and having an elongated extension thereof extending within an environment to be sensed, an actuation opening connecting said second chamber to said valve section, an upper poppet secured to said resilient diaphragm and extending through said actuation opening, said upper poppet having a central boss extending into said first chamber, a spring locater within said first chamber at said upper poppet and mounted on said boss, a coil spring disposed intermediate said thermally extensible power member and said spring locater for exerting a force on said central boss for biasing said upper poppet outwardly of said first chamber, a lower poppet within said valve section, a second resilient diaphragm disposed across said actuation opening, a bore formed centrally of both said upper and lower poppets, a pin forceably fitted within said bores and tightly interconnecting said upper and lower poppets, said upper and lower poppets thereby compressing said resilient diaphragm therebetween for providing a pressure seal between said control section and said valve section, and said upper poppet secured to said lower poppet and compressing said second resilient diaphragm therebetween for providing a pressure seal between said control section and said valve section, a valve seat formed intermediate said inlet and said outlet, a valve head attached to said lower poppet and being cooperable with said valve seat for controlling the flow of fluid from said inlet to said outlet.

4. A variable flow fluid control system comprising: a system housing having a control section and a valve section thereof, a resilient diaphragm extending across the interior of said control section for forming a first and second chamber thereby, said first chamber being connected to a vacuum source and said second chamber being connected to the atmosphere, a sensor opening formed within said housing at said first chamber substantially centrally of said resilient diaphragm, a thermal power unit disposed within said sensor opening and having a thermally extensible power member depending within said first chamber, a thermal element within said thermal power unit and having a plurality of extensions thereof, each of said extensions extending within an environment to be sensed, an actuation opening connecting said second chamber to said valve section, an upper poppet secured to said resilient diaphragm and extending through said actuation opening, a lower poppet within said valve section, a second resilient diaphragm disposed across said actuation opening, a bore formed centrally of both said upper and lower poppets, a pin forceably fitted within said bores and tightly interconnecting said upper and lower poppets, said upper and lower poppets thereby compressing said resilient diaphragm therebetween for providing a pressure seal between said control section and said valve section, a valve seat formed intermediate said inlet and said outlet, a valve head attached to said lower poppet and being cooperable with said valve seat for controlling the flow of fluid from said inlet to said outlet, biasing means disposed intermediate said thermally extensible power member and said lower poppet for maintaining said valve head against said valve seat.

(References on following page)

References Cited

UNITED STATES PATENTS

| | | | |
|---|---|---|---|
| 2,673,038 | 3/1954 | Vernet et al. | 237—8 |
| 2,719,674 | 10/1955 | Carter | 236—92 |
| 2,848,169 | 8/1958 | Obermaier | 237—8 X |
| 2,996,255 | 8/1961 | Boylan | 237—8 |
| 3,125,111 | 3/1964 | Daly | 237—8 X |
| 3,173,439 | 3/1965 | Griswold et al. | 251—61 X |

EDWARD J. MICHAEL, *Primary Examiner.*

ALDEN D. STEWART, *Examiner.*